(12) United States Patent
Laloy et al.

(10) Patent No.: US 8,390,156 B2
(45) Date of Patent: Mar. 5, 2013

(54) ROTOR FOR A MULTIPOLAR SYNCHRONOUS ELECTRIC MACHINE WITH SALIENT POLES

(75) Inventors: Daniel Laloy, Jeumont (FR); Guy Legoix, Maubeuge (FR); Alain Ducrot, Jeumont (FR); Brahim Ammar, Louvres (FR)

(73) Assignee: Jeumont Electric, Jeumont (FR)

( * ) Notice: Subject to any disclaimer, the term of this patent is extended or adjusted under 35 U.S.C. 154(b) by 0 days.

(21) Appl. No.: 12/993,450

(22) PCT Filed: May 15, 2009

(86) PCT No.: PCT/FR2009/050911
§ 371 (c)(1),
(2), (4) Date: Dec. 21, 2010

(87) PCT Pub. No.: WO2010/020724
PCT Pub. Date: Feb. 25, 2010

(65) Prior Publication Data
US 2011/0115315 A1 May 19, 2011

(30) Foreign Application Priority Data
May 19, 2008 (FR) ..................... 08 53242

(51) Int. Cl.
*H02K 3/24* (2006.01)
*H02K 21/12* (2006.01)
*H02K 1/24* (2006.01)
(52) U.S. Cl. ........ 310/59; 310/61; 310/156.48; 310/269
(58) Field of Classification Search ............. 310/156.48, 310/269, 59, 61, 156.49, 156.51, 156.52, 310/156.63, 216.091, 216.98
See application file for complete search history.

(56) References Cited

U.S. PATENT DOCUMENTS

| 3,728,566 | A | * | 4/1973 | Costello | 310/194 |
| 3,797,106 | A | | 3/1974 | Costello | |
| 3,846,651 | A | * | 11/1974 | Mishra | 310/61 |
| 4,554,475 | A | | 11/1985 | Sisk | |

FOREIGN PATENT DOCUMENTS

| EP | 1 276 205 A2 | | 1/2003 |
| GB | 974 730 A | | 11/1964 |
| GB | 2 425 662 A | | 11/2006 |
| JP | 59041147 A | * | 3/1984 |
| JP | 09093847 A | * | 4/1997 |
| JP | 2001-211607 A | | 8/2001 |
| JP | 2008067542 A | * | 3/2008 |

OTHER PUBLICATIONS

International Search Report as issued for PCT/FR2009/050911, dated Feb. 16, 2010.

* cited by examiner

*Primary Examiner* — Tran Nguyen
*Assistant Examiner* — Jose Gonzalez Quinones
(74) *Attorney, Agent, or Firm* — Pillsbury Winthrop Shaw Pittman, LLP

(57) ABSTRACT

A rotor for a multipolar synchronous rotating machine includes a plurality of salient poles, each salient pole including a polar body and being surrounded by an induction coil including a plurality of layers of coiled wire; a plurality of spacers such that each spacer of the plurality of spacers creates a first spacing between two successive layers of coiled wire of the plurality of layers for the circulation of coolant between each layer of coiled wire of the plurality of layers, the rotor including a second spacing between the polar body and each layer of coiled wire of the plurality of layers for the circulation of the coolant between the induction coil and the polar body.

8 Claims, 2 Drawing Sheets

ROTOR FOR A MULTIPOLAR SYNCHRONOUS ELECTRIC MACHINE WITH SALIENT POLES

CROSS-REFERENCE TO RELATED APPLICATIONS

This is the U.S. National Stage of PCT/FR2009/050911, filed May 15, 2009, which in turn claims priority to French patent application Ser. No. 08/53242, filed May 19, 2008, the entire contents of all applications are incorporated herein by reference in their entireties.

The present invention relates to the field of rotating synchronous electric machines comprising a stator assembly and a rotor assembly, the rotor assembly pivoting with relation to the stator assembly around an axis of rotation. More particularly, the present invention relates to a rotor for a multipolar synchronous electric machine with salient poles.

In general, rotors with salient poles have field poles situated at the periphery of a magnetic circuit ring.

These rotors are generally utilized in low speed applications up to 1000 rpm with laminated poles and 1500 rpm with solid poles.

In a known manner, the rotor for a synchronous electric machine with salient poles comprises:
 a central part formed by the magnetic circuit ring and a central shaft; for small-diameter rotors, the central shaft and the magnetic circuit ring only form a single part;
 salient poles or poles formed by a central part called either a pole body or polar body and a peripheral part called a pole shoe; constant induction flows through each pole in its central part; on the other hand, at the surface of the pole at a pole shoe, induction is pulsed as a result of rotation before the slots of the stator;
 Induction coils surrounding each polar body formed by a stack of coil turns.

Synchronous machines are electric machines in which the rotation speed of the output shaft is equal to the rotation speed of the magnetic field. Magnetization of rotating machines with salient poles is obtained by the inductor formed by the induction coils surrounding the polar bodies.

Induction coils are disposed around polar bodies in several ways.

According to a first known embodiment of a multipolar rotor with salient poles, each pole comprising a polar body and a pole shoe is added to a rim or to a shaft by means of plugs, dovetails or screws. In this embodiment, the coil is placed on the polar body before the body is mounted on the rim or shaft.

According to a second known embodiment, a synchronous rotor with salient poles consists of utilizing a polar body forming an integral part of the rim or shaft. Only the solid pole shoe is added and fixed to the polar body by means of several screws. The induction coil is placed around the polar body before assembly of the pole shoe.

Whatever the representation taken to date, energizing induction coils causes the coils to heat.

Induction coils comprise insulating materials that are sensitive to thermal aging. Therefore, it is necessary to cool the synchronous rotor and, more precisely, the induction coil in order to improve the lifetime of the coils.

To cool the induction coil when the rotor with salient poles is rotating, it is desirable that the induction coil has the largest possible exchange surface with the surrounding air.

In most known rotors with salient poles, the induction coil is naturally cooled by the surface of its periphery when the rotor is rotated. This type of cooling generally has reduced effectiveness.

Rotors with salient poles comprising a particular induction coil arrangement enabling air to circulate between certain layers of the induction coil, thus improving cooling of the induction coil, are also known. This interlayer circulation is made possible by pressed sections made by deformation of the flat copper parts, comprising the different layers of the induction coil.

However, deforming induction coil copper is an operation that is difficult, long and costly to implement, and requires a specific manufacturing process. On the other hand, the depth of the pressed sections making interlayer spaces is limited by the mode of producing the induction coil by deformation of flat copper parts, as flat copper part deformation is difficult to control.

In addition, the configuration of interlayer spaces is very sensitive to dust and air humidity pollution or coolant pollution, and to its consequences on electric circuits.

In this context, the invention aims to provide a rotor for a multipolar synchronous electric machine with salient poles, in which induction coil cooling is optimized while enabling simple, economical, rapid and pollution-resistant production and assembly of the rotor.

For this purpose, the invention proposes a rotor for a multipolar synchronous rotating machine comprising a plurality of salient poles, each salient pole being surrounded by an induction coil comprising a plurality of layers of coiled wire, said rotor being characterized in that the rotor comprises a plurality of spacers such that each spacer of said plurality of spacers creates a first spacing between two successive layers of coiled wire of said plurality of layers for the circulation of coolant between each layer of coiled wire of said plurality of layers, said rotor comprising a second spacing between said polar body and each layer of coiled wire of said plurality of layers for the circulation of said coolant between said induction coil and said polar body.

Thanks to the invention, it is possible to easily produce openwork induction coils enabling the induction coil to be effectively cooled while guaranteeing a simple assembly on polar bodies. The design of the coil by layers of coiled wire that are spaced apart by spacers guarantees coolant to circulate between the different layers of the induction coil while ensuring radial maintenance when the rotor is rotated.

The rotor for a multipolar synchronous electric machine with salient poles according to the invention may also present one or more of the characteristics below, considered individually or according to all technically possible combinations:
 said plurality of salient poles is integral with a ring, said ring comprising an aperture situated between two salient poles suitable for cooling said rotor;
 each salient pole of said plurality of salient poles comprises a plurality of removable pole tips facing each other on either side of said polar body;
 each pole tip of said plurality of pole tips is pushed into said polar body, said polar body comprising two slots arranged on either side of said polar body whose shapes are adapted to receive said facing pole tips;
 said two slots are made continuously along said polar body;
 each layer of coiled wire of said plurality of layers is formed by means of flat conductive wire;
 said second spacing is created by each spacer of said plurality of spacers;

the plurality of layers of coiled wire is radially maintained by means of a support sheet, said support sheet comprising at least one conduit suitable for circulating coolant.

Another object of the present invention is a method of cooling a rotor for a multipolar synchronous rotating machine characterized in that the method comprises the following steps:

cooling said plurality of layers of coiled wire by circulating coolant through said second spacing;

cooling each layer of coiled wire of said plurality of layers by circulating coolant through said first spacing.

According to another characteristic, the method is such that the method comprises a step of circulating coolant between the aperture and said second spacing by means of said conduit of said support sheet.

Other characteristics and advantages of the invention will more clearly emerge from the description given below, for indicative and in no way limiting purposes, with reference to the attached figures, among which:

In all figures, common elements bear the same reference numbers, unless otherwise indicated.

FIG. 1 represents a partial view of a rotor 100 with salient poles of a synchronous machine in section by a plane perpendicular to the axis of rotation of the rotor.

Figure 1:
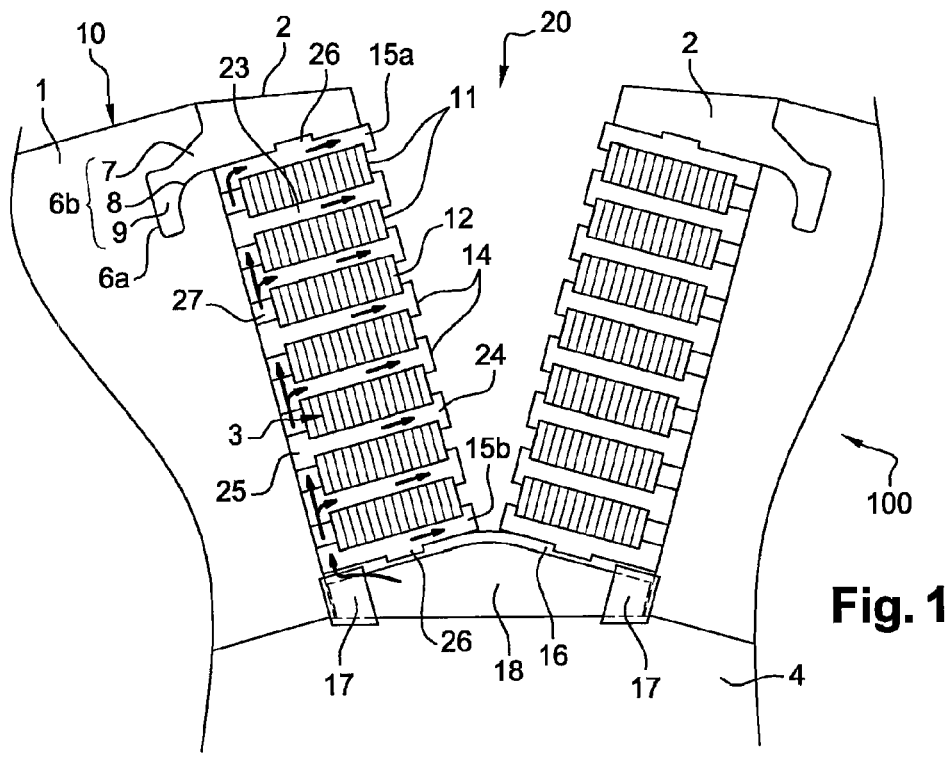
FIG. 1 is a partial view of a rotor with salient poles of a synchronous electric machine in section by a plane perpendicular to the axis of rotation of the rotor, according to a first embodiment.

FIG. 1 particularly represents a space 20 situated between two salient poles 10. Each salient pole 10 comprises a pole body or polar body 1 surrounded by an induction coil 3. The polar body 1 is a part forming an integral part with a rim 4 constituting the magnet wheel of the magnetic circuit of the synchronous electric machine. Rim 4 is preferentially made of a stack of steel electrical sheets hot-mounted onto a shaft or a hub (not represented).

According to another embodiment, polar body 1 is a solid one-piece body forming an integral part with the shaft.

According to an advantageous mode of the invention, rim 4 has a substantially polygonal shape. The polygonal shape of the rim is defined according to the number of poles that the rotor of the synchronous machine has.

The induction coil 3 is made with a copper conductor of circular or rectangular section surrounding the polar body 1 with a certain number of coil turns. In a first mode of embodiment, induction coil 3 is made in radial layers 11 (i.e., disposed according to different radius from the center of the rotor) of flat wire coil 12 wound in a spiral. Each radial layer 11 is radially spaced by spacers 14, 15a and 15b. Spacers 14, 15a and 15b are formed either from an insulating material or from a conductive material that needs to be insulated by an insulating material, the spacers in conductive material having better mechanical characteristics.

Insulation of the induction coil 13 turns is achieved by insulating strips pre-impregnated with a thermosetting resin. The coil is then pressed and undergoes a heat treatment which enables a compact assembly with excellent thermal conductivity to be obtained.

According to another embodiment of the invention, the induction coil 3 is made with fiberglass-covered wires. The insulated wire is then wound over several layers. Varnish or resin is interposed between each wire layer to provide a final rigidity to the induction coil 3 after polymerization.

It is also possible, according to another embodiment of the invention, to make the induction coil 3 with thermoadherent enameled wires. The thermoadherent wires are enameled wires covered with an outer layer enabling bonding of the coil turns assembled by polymerization of this outer layer under the effect of the temperature; therefore the application of a varnish or resin when the induction coil 3 is made is unnecessary.

Pole tips 2 are situated, by pairs, on either side of the polar body 1 over its entire length, a single pole tip pair 2 being represented on each polar body 1 of FIG. 1. The pole tip 2 pairs maintain induction coil 3 in position on either side of polar body 1. For this purpose, polar body 1 comprises slots 6a corresponding to the shape of hooks 6b of pole tips 2; Slots 6a of each sheet of the stack are aligned over the entire length of polar body 1, thus forming a conduit. Hooks 6b enable placement by fitting together and then by sliding in slots 6a of pole tips 2 without any other fixation means. The fitting together is carried out by each end of polar body 1 and the sliding along the longitudinal direction of said polar body 1. Hooks 6b have the shape, for example, of a hook oriented substantially towards the center of the rotor, composed of a first part 7 of substantially triangular section meeting a second part 9 of substantially rectangular section, the two parts 7 and 9 being connected by a bent element 8.

The particular shape of hooks 6b enables radial holding of pole tips 2, and enables the stresses caused by the centrifugal force of induction coil 3 when the rotor is rotated to be supported, and particularly the stresses caused by the radial component.

Spacers 14, 15a and 15b are uniformly inserted between the different radial layers 11, thus forming an inter-radial layer 11 space 23 enabling coolant to circulate between radial layers 11, illustrated by arrows. On a radial layer 11, spacers 14, 15a and 15b are uniformly distributed over the entire length of radial layer 11. According to an advantageous mode of the invention, each spacer 14, 15a and 15b is longitudinally spaced by a second spacer, by a distance of substantially between ten and one hundred millimeters.

Spacers 14 are symmetrical plates with relation to a horizontal plane having a substantially rectangular shape of several millimeters of thickness. Spacers 14 comprise an added thickness 24 at their right ends and an added thickness at their left ends, added thicknesses 24 and 25 being symmetrical on either side of the horizontal plane of symmetry. Thus, added thicknesses 24 and 25 enable two radial layers 11 of induction coil 3 to be included and edged, a radial layer 11 in the upper part of spacer 14 and a radial layer 11 in the lower part of the spacer. Thus, by their shape and disposition, spacers 14 enable the different radial layers 11 of induction coil 3 to be maintained separately by creating interlayer space 23 for the circulation of a coolant illustrated by arrows in FIG. 1.

The added thicknesses 25 on the left of spacers 14 are also suitable for maintaining the induction coil 3 of the periphery of polar body 1 apart, the outer face of spacer 14 at the level of added thickness 25 being in contact with polar body 1. In this way, a space 27 is formed between induction coil 3 and the outer surface of polar body 1; space 27 being equivalent to the width of added thickness 25. Thus, space 27 guarantees the circulation of coolant and guarantees ground insulation between the induction coil 2 and the peripheral surface of polar body 1.

Upper 15a and lower 15b spacers, i.e., spacers disposed above the last radial layer 11 or upper layer and below the first radial layer 11 or lower layer of induction coil 3 have a slightly different shape than the spacers 14 detailed previously. Spacers 15a and 15b are also plates having a substantially rectangular shape of some millimeters thickness. Spacers 15a and 15b also comprise a left added thickness and a right added thickness at their two ends but only on one of the two faces of the spacer. The second face of spacer 15a, 15b comprises a central added thickness 26 of substantially rectangular shape situated substantially in its center enabling spacers 15a and 15b to be positioned and held fixed.

The upper face of upper spacer 15a comprising added thickness enables spacer 15a to be maintained and positioned by means of pole tips 2 when the latter are positioned on polar body 1. Similarly, the lower face of lower spacer 15b comprising central added thickness 16 enables spacer 15b to be positioned and maintained fixed by means of the support sheet 16.

Pole tips 2 and support sheet 16 have a cutout of material in the shape of the added thickness of spacers 15a and 15b so as to unite said added thickness and to maintain said spacers.

The support sheet 16 is a sheet folded in a V shape disposed at the level of space 20 of rotor 100 with salient poles, i.e., between two salient poles 10 and more precisely between two polar bodies 1.

At the level of space 20 of rotor 100, two induction coils 3, each surrounding a polar body 1, are opposite each other. Support sheet 16 maintains part of the induction coils opposite each other at the level of space 20 of rotor 100. To do this, support sheet 16 is introduced between two polar bodies 1 when induction coils 3 are assembled around polar bodies 1 and as the pole tips 2 are introduced in polar body 1. In a first embodiment illustrated in FIG. 1, fixation blocks 17 are utilized under support sheet 16 in order to maintain induction coil 3 radially pressed against pole tips 2 with a certain pressure.

The radial holding of the induction coil 3 is achieved in its upper part by pole tips 2, and in its lower part by the support sheet 16. The radial holding of the induction coil 3 in its lower part may also be achieved by any other equivalent means enabling the induction coil 3 to be pressed against pole tips 2.

According to a second mode of embodiment, the radial holding of induction coil 3 in its lower part may be carried out by means of a set of compressed springs 31, illustrated with reference to FIG. 3.

Thus, spacers 14, 15a and 15b as well as the holding pressure exerted on induction coil 3 and on the spacers by the pole tips 2 in its upper part and by the support sheet 16 in its lower part, enable induction coil 3 to be maintained in position and, in particular, to compensate for the tangential component of the centrifugal force when the rotor is rotated.

A space 18 is provided under support sheet 16. This space 18 is suitable for, on the one hand, facilitating the introduction of support sheet 16 under induction coils 3 and, on the other hand, enabling a longitudinal distribution of the coolant leading to circulation of the fluid, illustrated by arrows, through the radial layers 11 of induction coil 3.

Figure 3:
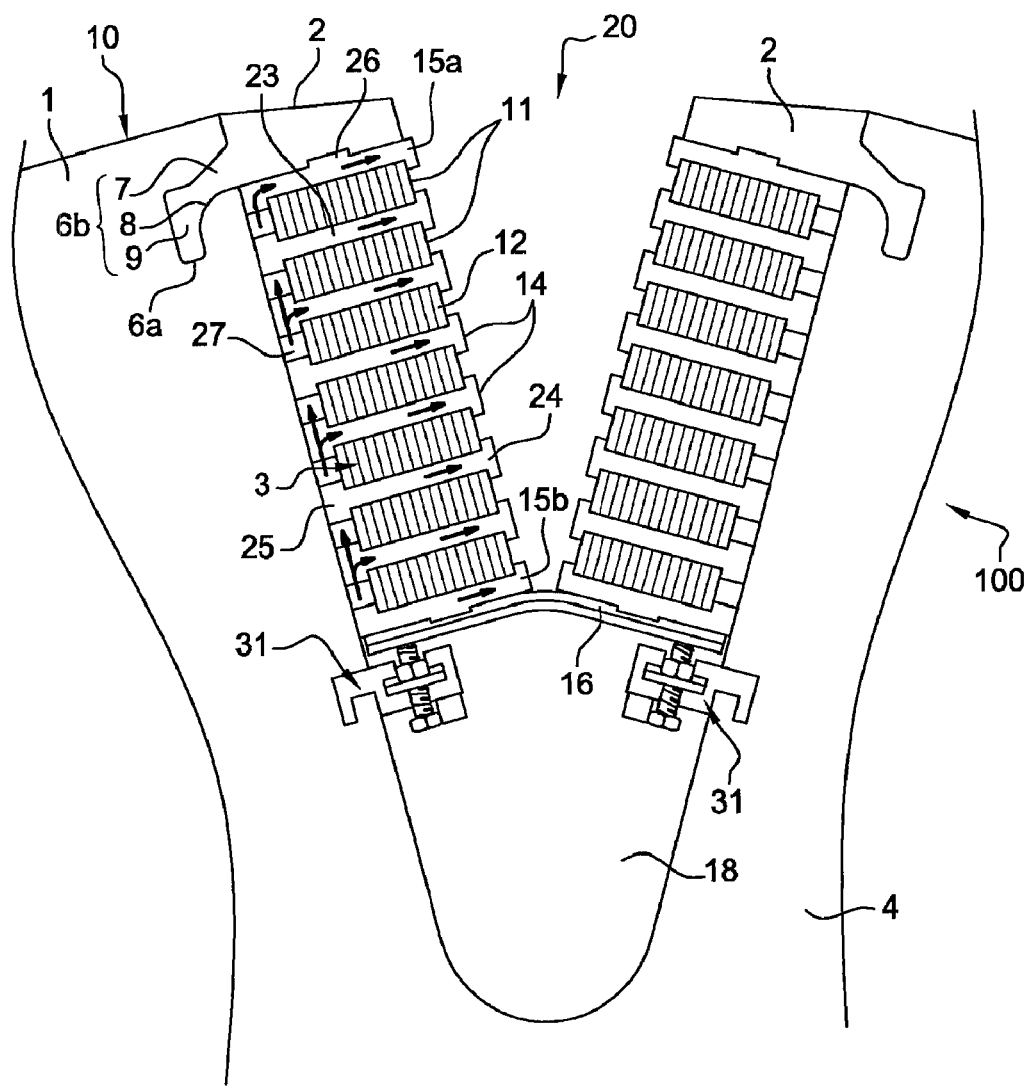
FIG. 3 is a partial view of a rotor with salient poles of a synchronous electric machine in section by a plane perpendicular to the axis of rotation of the rotor, according to a second embodiment.

In another mode of embodiment of the invention, illustrated by FIG. 3, it is also possible to enlarge space 18 by making an aperture in rim 4 so as to increase the circulation of coolant inside induction coil 3. It is also possible to have a fan at the inlet of this space 18 so as to create a coolant circulation flow or to increase the natural circulation flow created by rotation of the rotor.

When rotor 100 is rotated, the surrounding ambient air or coolant rushes into space 18; the flow of coolant entering may be increased by adding a fan at the inlet of space 18 as described previously.

The coolant circulates through induction coil 3 according to the arrows explicitly illustrating the circulation.

The coolant then migrates from space 18 through a conduit present in support sheet 16 to space 27. The coolant then circulates from space 27 towards interlayer spaces 23 created by spacers 14, 15a and 15b, and then escapes to space 20, thus enabling the fluid to be renewed.

The coolant circulating in spaces 27 and 23 performs thermal exchanges with the different radial layers 11 of induction coil 3, thus enabling an advantageous cooling of the coil.

It is also possible to block space 20 between two salient poles so as to force the circulation of an air passage in space 18 and thus improve cooling of induction coil 3 by increasing the coolant circulation flow through radial layers 11.

Figure 2:
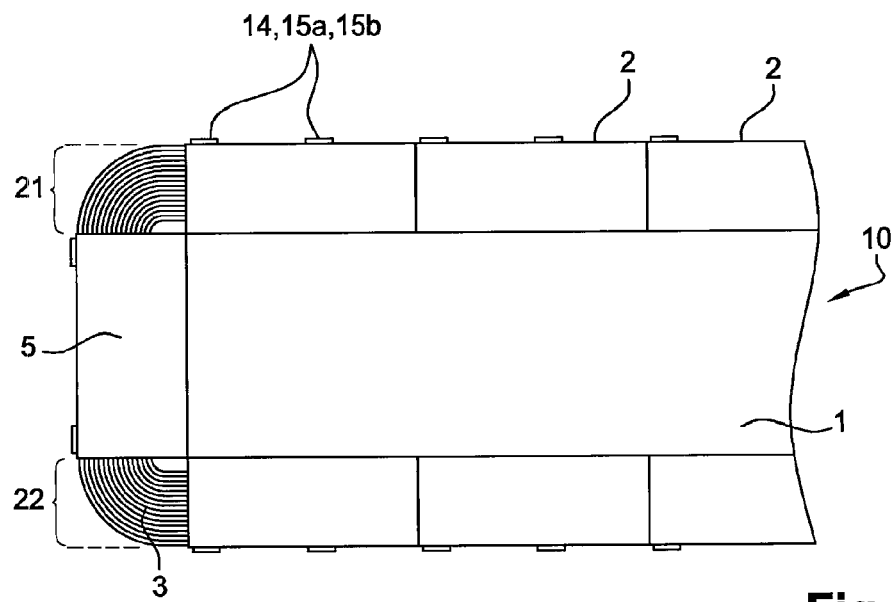
FIG. 2 is a top view of a polar body of a rotor with salient poles such as represented in FIG. 1.

FIG. 2 is a top view of a polar body 1 of a rotor 100 with salient poles of a synchronous electric machine according to the invention represented with reference to FIG. 1.

FIG. 2 particularly illustrates a series of pole tips 2 positioned on polar body 1 and radially blocking the induction coil 3 of the pole.

Flanges 5, situated at the ends of polar body 1 (only one flange 5 is represented), are maintained integral with rim 4 by means of a screw-type fixation system. Flanges 5 are solid parts in machined, forged or molded steel that enable pole tips 2 to be maintained in position after their placement on polar body 1. They thus prevent any longitudinal displacement of pole tips 2. In fact at the ends of polar body 1, flanges 5 obstruct slots 6a of polar body 1 corresponding to hooks 6b such that the pole tips 2 can no longer be taken apart or displaced in the longitudinal direction of polar body 1. Flanges 5 also enable the front part of the induction coil 3 to be radially maintained and enable the induction coil 3 assembly to be positioned axially.

The combined utilization of pole tips 2, and flanges 5 in replacement of a pole shoe according to the prior art enables two uncovered areas 21 and 22 to be disposed at each end of induction coil 3. These areas 21 and 22 improve the cooling of induction coil 3 by increasing its contact surface with ambient air or any other coolant.

The device illustrated in FIG. 3 comprises the same elements and same references as the device illustrated in FIGS. 1 and 2, with the exception of the means for radially maintaining induction coil 3 by a set of compressed springs 31.

In addition, FIG. 3 illustrates a second mode of embodiment of space 18 making an aperture in rim 4 enabling the circulation of coolant inside induction coil 3 to be increased.

Mounting of the illustrated rotor with salient poles for a synchronous machine is carried out easily and rapidly with a limited number of tools.

In a first step, induction coil 3 is made separately by radial layers 11 and then is assembled with spacers 14, 15a, 15b. According to a second mode of embodiment, induction coil may be made by successive coil turns on each layer, starting from an outer layer of the induction coil and then going back up layer by layer to the inner layer of the induction coil 3 and then going back down to the outer layer: this operation is repeated until the coil is fully wound. This mode of embodiment thus enables the number of brazed connections to be reduced.

In a second step, the complete and polymerized induction coil 3 is then introduced around polar body 1 in a position that is closer to the rotor center, allowing slots 6a of polar body 1 to be completely cleared.

Pole tips 2 are threaded by sliding on polar body 1 by means of slots 6a.

Flanges 5 are then threaded and fixed on rim 4 or on polar body 1 by means of screws. The pole tips 2 are thus blocked longitudinally.

The induction coil 3 is then pressed against pole tips 2 so as to free a space 18 under the induction coil in the object of introducing support sheet 16 by sliding in the longitudinal direction of polar body 1. The support sheet 16 is then held pressed against induction coil 3 by means of fixation blocks 17 that are mounted by force, a set of compressed springs 31 or any other equivalent means.

The fixation blocks 17 or set of compressed springs 31 exert a certain contact pressure on the coil that is held on the one hand by pole tips 2 in its outer part and on the other hand by the support sheet 16 in its inner part. Thus, induction coil 3 is radially maintained when the rotor is stopped and rotated.

All the operations described for the mounting of pole tips 2 and flanges 5 on polar body 1 are easily performed without special tools.

Thus, the object of the invention is the production of a multipolar rotor with salient poles for a synchronous electric machine allowing effective cooling of the induction coil, thus significantly improving coil lifetime. In addition, the clever shape of the pole tips combined with the utilization of spacers enables the utilization of corner wedging for the tangential holding of the induction coil during rotation of the rotor to be significantly reduced, thus enabling improved cooling of the coil with the increased surface of the coil in contact with a coolant such as air.

Lastly, the rotor with salient poles according to the invention enables simple and rapid assembly without special tools. The clever shape of the pole tips enables both a rapid and easy assembly and enables the induction coil to be maintained when the rotor is stopped and rotated.

In addition, when it is necessary to clean, repair or replace an induction coil, the disassembly operation is largely facilitated, without resorting to special tools, and is quick.

A multipolar rotor with salient poles for a synchronous electric machine comprising a laminated polar body and a laminated rim has essentially been described; however, the invention is also applicable to a multipolar rotor with salient poles for a synchronous electric machine comprising a solid polar body. The invention essentially described a multipolar rotor with salient poles comprising polar bodies integrated with the rim of the rotor; however, the invention is also applicable to a multipolar rotor with salient poles comprising polar bodies added to a rim or to a shaft by means of plugs, dovetails or screws.

Other advantages of the invention are, in particular, as follows:
- improved cooling of the multipolar rotor with suppression of the utilization of corner wedging;
- facilitated industrial production;
- significant increase in coil lifetime;
- removal the need for ground insulation of induction coils;
- easy disassembly of induction coils during maintenance, renovation or repair operations;
- immunity to the electrical effects of induction coil pollution.

The invention claimed is:

1. A rotor for a multipolar synchronous rotating machine comprising:
    a plurality of salient poles, each salient pole including a polar body and being surrounded by an induction coil comprising a plurality of layers of coiled wire, said plurality of salient poles being integral with a ring, said ring comprising an aperture situated between two salient poles suitable for cooling said rotor;
    a plurality of spacers such that each spacer of said plurality of spacers creates a first spacing between two successive layers of coiled wire of said plurality of layers for the circulation of coolant between each layer of coiled wire of said plurality of layers, said rotor comprising a second spacing between said polar body and each layer of coiled wire of said plurality of layers for the circulation of said coolant between said induction coil and said polar body,
    said plurality of layers of coiled wire being radially maintained with a support sheet, said support sheet comprising at least one conduit suitable for circulating a coolant from said aperture towards said second spacing;
    said first spacing and said second spacing being arranged such that the coolant circulates from said second spacing towards said first spacing between two layers of coiled wire.

2. The rotor for a multipolar synchronous rotating machine according to claim 1, wherein each salient pole of said plurality of salient poles comprises a plurality of removable pole tips facing each other on either side of said polar body.

3. The rotor for a multipolar synchronous rotating machine according to claim 2, wherein each pole tip of said plurality of pole tips is pushed into said polar body, said polar body comprising two slots arranged on either side of said polar body whose shapes are adapted to receive said facing pole tips.

4. The rotor for a multipolar synchronous rotating machine according to claim 3, wherein said two slots are made continuously along said polar body.

5. The rotor for a multipolar synchronous rotating machine according to claim 1, wherein each layer of coiled wire of said plurality of layers is formed by means of flat conductive wire.

6. The rotor for a multipolar synchronous rotating machine according to claim 1, wherein said second spacing is created by each spacer of said plurality of spacers.

7. A method for cooling a rotor for a multipolar synchronous rotating machine according to claim 6, the method comprising:
    cooling said plurality of layers of coiled wire by circulating coolant through said second spacing;
    cooling each layer of coiled wire of said plurality of layers by circulating coolant through said first spacing.

8. The method for cooling a rotor for a multipolar synchronous rotating machine according to claim 7, said plurality of salient poles being integral with a ring, said ring comprising an aperture situated between two salient poles suitable for cooling said rotor, said method comprising circulating coolant between the aperture and said second spacing by means of said conduit of said support sheet.

* * * * *